(12) United States Patent
Baker et al.

US012244558B1

(10) Patent No.: US 12,244,558 B1
(45) Date of Patent: Mar. 4, 2025

(54) CLIENT-OPERATED AND PORT-RANGE LEASE BASED SOURCE NETWORK ADDRESS TRANSLATION

(71) Applicant: Snowflake Inc., Bozeman, MT (US)

(72) Inventors: Brandon S. Baker, Redmond, WA (US); Niranjan Kumar Sharma, Redmond, WA (US); Xuguang Yang, Bellevue, WA (US); Haowei Yu, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/477,918

(22) Filed: Sep. 29, 2023

(51) Int. Cl.
*H04L 61/2517* (2022.01)
*H04L 9/40* (2022.01)
*H04L 61/2521* (2022.01)
*H04L 12/46* (2006.01)

(52) U.S. Cl.
CPC ...... *H04L 61/2517* (2013.01); *H04L 61/2525* (2013.01); *H04L 63/0281* (2013.01); *H04L 12/46* (2013.01)

(58) Field of Classification Search
None
See application file for complete search history.

(56) References Cited

U.S. PATENT DOCUMENTS

| | | | | |
|---|---|---|---|---|
| 7,945,685 | B2 * | 5/2011 | Kleyman | H04L 65/65 709/229 |
| 9,374,294 | B1 * | 6/2016 | Pani | H04L 41/0893 |
| 11,863,528 | B1 * | 1/2024 | Chung | H04L 69/22 |
| 2011/0219113 | A1 * | 9/2011 | Grewal | H04L 61/2514 709/224 |
| 2013/0174242 | A1 * | 7/2013 | Snow | H04L 65/70 726/12 |
| 2014/0156836 | A1 * | 6/2014 | Demmer | H04L 67/52 709/224 |
| 2015/0124805 | A1 * | 5/2015 | Yadav | H04L 49/25 370/389 |
| 2015/0124809 | A1 * | 5/2015 | Edsall | H04L 12/4645 370/390 |
| 2015/0124821 | A1 * | 5/2015 | Chu | H04L 45/50 370/392 |
| 2016/0094467 | A1 * | 3/2016 | Hong | H04L 47/2441 370/235 |
| 2017/0244645 | A1 * | 8/2017 | Edsall | H04L 47/70 |

(Continued)

FOREIGN PATENT DOCUMENTS

JP 2004533159 A * 4/2002 ............. H04L 12/56

*Primary Examiner* — Phyllis A Book
(74) *Attorney, Agent, or Firm* — Womble Bond Dickinson (US) LLP

(57) ABSTRACT

This disclosure provides methods and techniques of performing source network address translation (SNAT) at a packet sender (e.g., a client device) instead of a gateway device (e.g., a proxy device). The present disclosure performs a SNAT operation at the packet sender, relieving the gateway device from the SNAT operation to perform other duties (e.g., policy enforcement). An example method of network address translation includes modifying, by a processing device at a data packet origination device (e.g., a client device), network address information in an internet protocol (IP) header of a packet using a public IP address. The method further includes sending the packet to a public network based on the public IP address.

24 Claims, 8 Drawing Sheets

(56) References Cited

U.S. PATENT DOCUMENTS

| | | | | |
|---|---|---|---|---|
| 2017/0366506 | A1* | 12/2017 | Panchalingam | H04L 65/1104 |
| 2018/0006969 | A1* | 1/2018 | Venkateshaiah | H04L 61/103 |
| 2019/0182076 | A1* | 6/2019 | Verkaik | H04L 12/4633 |
| 2020/0213151 | A1* | 7/2020 | Srivatsan | H04L 63/0471 |
| 2020/0304458 | A1* | 9/2020 | Fujii | H04L 12/4633 |
| 2020/0358636 | A1* | 11/2020 | Shribman | H04L 61/2585 |
| 2021/0273927 | A1* | 9/2021 | Dhanabalan | H04L 63/0478 |
| 2021/0352047 | A1* | 11/2021 | Singh | H04L 61/2592 |
| 2022/0129514 | A1* | 4/2022 | Shribman | H04L 67/146 |
| 2023/0179563 | A1* | 6/2023 | Goodwin | H04L 61/2528 709/245 |
| 2023/0269275 | A1* | 8/2023 | Mestery | H04L 63/0254 726/4 |

\* cited by examiner

CLIENT-OPERATED AND PORT-RANGE LEASE BASED SOURCE NETWORK ADDRESS TRANSLATION

TECHNICAL FIELD

The present disclosure relates to internet communications and more particularly to network address translation.

BACKGROUND

Databases are widely used for data storage and access in computing applications. One of the goals of database storage is to provide enormous sums of information in an organized manner so that the information can be easily accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

Network address translation (NAT) is a networking method that remaps one internet protocol (IP) address space into another. NAT occurs as network address information in the IP header of packets gets modified while the packets move through a traffic routing device. NAT has become prevalent in various networks, due to the shortage of IPv4 addresses. For example, given that billions of devices are connected to the Internet, and the IPV4 protocol permits just over 4 billion addresses, the available address space would be insufficient. NAT provided a temporary workaround to this challenge by enabling multiple devices on a local network to share a singular public IP address when accessing resources on the Internet.

NAT may operate in several modes. For example, static NAT provides a one-to-one mapping, remapping an unregistered IP address to a registered (public) IP address. Static NAT proves useful when an internal device requires external accessibility. Dynamic NAT maps an unregistered IP address to a registered IP address, but it draws from a pool of available registered addresses. Unlike static NAT, dynamic NAT does not maintain a strict one-to-one mapping. Port Address Translation (PAT) or "NAT overload," enables multiple internal IP addresses to map to a singular public IP address, differentiated by unique port numbers. NAT overload is prevalent in home routers, allowing various devices in a household to connect to the Internet via one public IP address.

In a typical home network scenario, for example, each device within this network possesses a private IP address, often denoted as 192.168.1.x. While these addresses are unique within the local network, they are not directly routable on the wider Internet. When a device seeks to access an external website, the request first lands on the home router. The home router, equipped with NAT, translates the device's private IP to the router's public IP (unique with regard to the public network). If multiple devices dispatch requests simultaneously, the router differentiates each request using distinct port numbers. As the targeted website responds, it addresses its reply to the router's public IP. Upon receipt, the router, referencing its NAT translation table, translates the destination back from its public address to the private address of the original requesting device. This table maintains a record of outgoing requests, ensuring that all incoming responses are accurately relayed to their originating sources within the local network.

Despite its numerous benefits, including the conservation of public addresses and an added layer of security through the obfuscation of internal IP addresses, NAT may nonetheless create security concerns and/or disrupt the intrinsic end-to-end connectivity of the Internet (as the ideal is for each device to have the capability to directly connect with any other device). For a database management system that involves many client devices, however, the use of NAT is often inevitable.

Source network address translation (SNAT) is a type/ subtype of NAT, focusing explicitly on changing the source IP address of outgoing packets. In scenarios where a device from a private network sends data to an external network, like the Internet, SNAT comes into play. SNAT translates the source IP address of the packet, which is the device's private IP, to a public IP address. This translation ensures that any external destination, such as a website, perceives the incoming request as originating from a public IP address. Upon receiving a response, the NAT mechanism handles the reverse translation, ensuring the data returns to the appropriate device within the private network. In some cases, using egress proxies in SNAT may introduce reliability, security, and maintenance/performance concerns.

In light of the foregoing, disclosed herein are systems, methods, and devices for database replication and enhancements thereof.

SUMMARY

The present disclosure presents systems, methods, and techniques for performing source network address translation (SNAT) at a packet sender (e.g., a client device) instead of a gateway device (e.g., a proxy device). Conventionally, a gateway device performs SNAT in which the source IP address in the network packets is translated from one internet protocol (IP) address (e.g., a private IP address) to another (e.g., a public IP address). The gateway device maintains a mapping between the old and new addresses and on the reverse path, performs an opposite translation on the return packets' destination IP address. The present disclosure, instead, performs a SNAT operation at the packet sender, relieving the gateway device from the SNAT operation to perform other duties (e.g., policy enforcement).

According to a general aspect of this disclosure, an example method of network address translation includes modifying, by a processing device at a data packet origination device (e.g., a client device), network address information in an internet protocol (IP) header of a packet using a public IP address. The method further includes sending the packet to a public network based on the public IP address.

In aspects, sending the packet to the public network includes sending the packet via a proxy device. The proxy device maintains the public identifier of the packet without further modification. In some cases, the method further includes partitioning multiple port ranges at the proxy device, wherein one or more of the multiple port ranges is unique to the data packet origination device. The method may further include receiving, at the data packet origination device, the return packet based on the one or more of the multiple port ranges partitioned at the proxy device. The one or more of the multiple port ranges may include an IP address and a port range tuple.

In some cases, the proxy device maintains a client map, a table of at least one of: the network address information; a client identifier associated with the data packet origination device; or the multiple port ranges and corresponding clients. The method further includes registering, by the processing device at the data packet origination device, a policy with the proxy device. The one or more of the multiple port ranges is partitioned for the data packet origination device upon the registering of the policy. In some cases, the processing device at the data packet origination device generates the client identifier for self-identification in the policy registered with the proxy device.

In some cases, the processing device modifies the network address information in the IP header of the packet using the public IP address by translating, based on the one or more of the multiple port ranges, a private network address into a public network address. The network address information includes a source IP (e.g., of a secondary IP address) of the proxy device. In some cases, the client map is keyed using at least a highest number of bits of port and respective IP addresses.

According to another general aspect, a data packet origination device includes a memory; and a processing device operatively coupled to the memory. The a processing device and the memory are configured to modify network address information in an internet protocol (IP) header of a packet using a public IP address and send the packet to a public network based on the public IP address.

In aspects, the processing device sends the packet to the public network by: sending the packet via a proxy device, wherein the proxy device maintains the public identifier of the packet without further modification. In some cases, the processing device is further to associate with one of multiple port ranges that is unique to the data packet origination device, wherein the multiple port ranges are partitioned at the proxy device. In some cases, the processing device is further to receive, via the proxy device, a return packet from the public network and to receive, at the data packet origination device, the return packet based on the one or more of the multiple port ranges. The one or more of the multiple port ranges may include an IP address and a port range tuple.

In some cases, the proxy device maintains a client map, a table of at least one of: the network address information; a client identifier associated with the data packet origination device; or the multiple port ranges and corresponding clients. The processing device is further to register a policy with the proxy device, wherein the one or more of the multiple port ranges is partitioned for the data packet origination device upon the registering of the policy. The processing device is further to generate, the client identifier at the data packet origination device, for self-identification in the policy registered with the proxy device.

According to a general aspect of the present disclosure, a non-transitory computer-readable medium has instructions stored thereon. The instructions, when executed by a processing device, cause the processing device to modify, by a processing device at a data packet origination device, network address information in an internet protocol (IP) header of a packet using a public IP address; and send the packet to a public network based on the public IP address. In some cases, the processing device is further to send the packet via a proxy device that maintains the public identifier of the packet without further modification. The a processing device associate with one of multiple port ranges that is unique to the data packet origination device, wherein the multiple port ranges are partitioned at the proxy device.

Detailed implementations and examples are further described below.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure may become better understood with regard to the following description and accompanying drawings where.

Like reference numerals indicate like elements.

DETAILED DESCRIPTION

Figure 1:
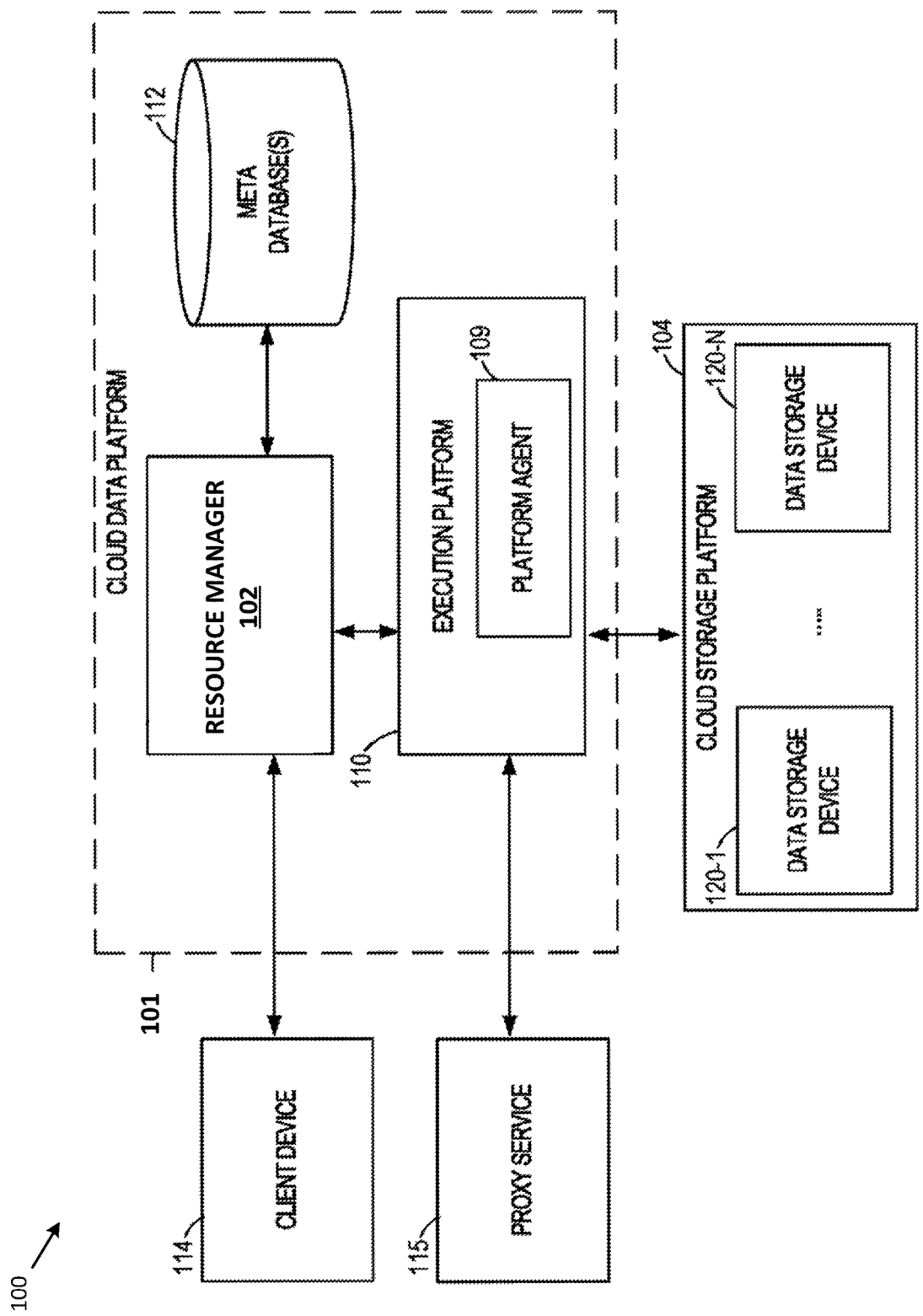
FIG. 1 illustrates a block diagram of components of a cloud data platform in communication with a client device and a proxy service in accordance with the teachings and principles of the disclosure.

The present disclosure provides systems, methods, and devices for performing source network address translation (SNAT) at a packet sender (e.g., a client device) instead of a gateway device (e.g., a proxy device). For example, a method of network address translation (NAT) includes modifying, by a processing device at a data packet origination device (e.g., a client device), network address information in an internet protocol (IP) header of a packet using a public IP address. The method may further include sending the packet to a public network based on the public IP address.

Source Network Address Translation (SNAT) on the conventional egress proxies may have undesirable consequences. For example, the conventional egress proxies may result in issues related to reliability, security, ease of maintenance, performance, and/or cost. The present disclosure provides methods and techniques of moving SNAT to client devices (such as XPs) using leased blocks of IP addresses and ports from the proxy device (an egress proxy).

Conventionally, SNAT is a common networking operation in which the source IP address in the network packets is translated from one (usually private IP address) to another (usually public IP address) when the network packets transit through a (usually) gateway device. The gateway device maintains the mapping between the old and new addresses and on the reverse path, performs an opposite translation on the packets' destination IP address. As the gateway device performs the translation, the address of the network packets is translated into one of the public address of the gateway device.

By comparison, the present disclosure moves the SNAT operation to the packet originator/sender (e.g., the client device), while the address being translated to is still that of the gateway device (e.g., an proxy device), the gateway device is relieved from having to perform the SNAT operation, thus allowing for performing other operations, such as policy enforcement, among others. As a result, the present disclosure provides several advantages, including improving the availability of the proxy device, improving security and scalability, and reducing maintenance costs of the proxy device, among other benefits.

For example, as a result of moving the SNAT operation to the data packet originator, the egress proxies benefit from high availability for packet forwarding. To achieve high availability, redundancy and failover are often utilized. For example, when an active proxy device fails, a standby proxy device may quickly take over the operation in a minimal impactful manner. A proxy device that performs SNAT operations may face many difficulties to fail over. However, because SNAT operates on NAT tables that are often huge and rapidly changing, and the NAT tables need be replicated at the standby proxy when fail over. As such, by delegating the SNAT operation to the client devices, which are also the originator of the data packets, the egress proxies may improve the fail-over functions. In this situation, the proxy device may keep track of which port block is leased out to which client device, and replicate this info to the standby proxy device. This results in much less data to be replicated and slower changing in the data to be replicated. The same functionality as the proxy device performing SNAT is achieved by having the data originator device performing the SNAT operation, while allowing the proxy device to be easily failed over.

In addition, the present disclosure improves the security at the client devices.

Conventionally, since the client devices may host customer code, the client devices can be compromised. The present disclosure has the proxy device leasing out SNAT port ranges to the client devices, thus adding a layer of protection against spoof attacks. When a compromised client device sends an egress packet that is not in the allocated port range for the client device, the egress packet may be flagged as a potential attack and the egress packet may be rejected.

The present disclosure improves the scalability, cost, and performance of SNAT operations. Conventionally, egress proxies are usually deployed on the dedicated computing machines, such as the AWS EC2, and the egress proxies usually need to proxy external access for a large number of clients. With the removal of SNAT operations from the proxy devices, the computational load and memory capacity requirements on the egress proxies are greatly reduced. As a result, a fewer number of egress proxies may be employed to serve a given pool of clients (client devices). Furthermore, less expensive machine types for egress proxies may be used. And a greater number of clients may be served by the same number of proxy devices.

The maintenance aspects or the long-term health of egress proxies are also improved. When NAT is performed at the proxy devices, the system may not be able to reliably tell whether a particular entry is currently in use. Conventionally, the least recently used (LRU) may be used to clean up entries. However, LRU is fraught with many problems. The present disclosure provides methods in which the NAT is leased out block-wise to the individual clients. As such, there is no central NAT table to maintain at the proxy device. When the client has finished the network access transaction, the entire NAT block may be returned and re-used by other clients.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

In describing and claiming the disclosure, the following terminology may be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g. files or blocks.

As used herein, "partitioning" is defined as physically separating records with different data to separate data partitions. For example, a table can partition data based on the country attribute, resulting in a per-country partition.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code may be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It may also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

The following described systems and methods may be applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Referring now to FIG. 1, a system 100 is illustrated for running the methods disclosed herein. As shown in FIG. 1, the system 100 includes a cloud data platform 101 in communication with a client device 114, a proxy service device 115, and a cloud storage platform 104. The cloud data platform 101 includes a resource manager 102, which is coupled to one or more client devices 114, meta databases 112, and the execution platform 110. The execution platform 110 may be coupled to the cloud storage platform 104, which includes multiple data storage devices 120-1 to 120-N. The execution platform 110 includes a platform agent 109.

The system 100 offers an architecture that leverages cloud computing and improves the performance, concurrency, and simplicity over conventional shared-disk or shared-nothing architectures. For example, the system 100, including the cloud data storage platform 104 may use a multi-cluster architecture with a separation of storage, compute, and services. For example, data may be stored in a centralized fashion in cloud storage or similar centralized data storage. The data may be stored in an optimized, compressed, and/or columnar format that allows for efficient query performance. The storage layer may be immutable to ensure data integrity and supports certain features (e.g., Time Travel).

The cloud data platform 101 may include multiple cloud computing services to provide a unified manner for managing, storing, analyzing, and sharing data. The multiple cloud computing services may include, for example, data lakes, data warehouses, data processing, and/or data visualization (not all are illustrated in the example system 100). For example, data lakes may include centralized repositories of data of an organization, regardless of the format or structure. As such, the cloud data platform 101 enables accessing and storing data from multiple sources, such as operational databases, social media platforms, and/or sensors. Data warehouses may include databases that are optimized for analytical queries. Data processing services may prepare data for analysis and to extract insights from data, such as data mining and/or machine learning. Data visualizing tools may create interactive dashboards and reports for data sharing and providing insights to stakeholders.

The resource manager 102 acts as an orchestrator for computing resources. For example, the resource manager 102 may be coupled to multiple users, such as the client devices 114. When a client device 114 makes a request, the resource manager 102 may assess the nature of the request and manage the needed computing resources, such as virtual warehouses, for processing the request. In particular implementations, the resource manager 102 may support any number of users or client devices 114 desiring access to the cloud data platform 101. The client devices 114 may include, for example, end users providing data storage and retrieval requests, system administrators managing the systems and methods described herein, and other components/devices that interact with the resource manager 102. An example client device 114 may include any user or application interface, such as, for example, a desktop computer or similar device that provides a web interface or connection to the cloud data platform 101.

The resource manager 102 is coupled with one or more meta databases 112, which may house the metadata including table structures, data file locations, query histories, user permissions, and other essential data used for query optimization, management, and system operation. The resource manager 102 provides various services and functions that support the operation of all systems and components within the cloud data platform 101. The resource manager 102 may be coupled to the meta database 112, which is associated with the entirety of data stored throughout cloud data platform 101. In some embodiments, the meta database 112 may include a summary of data stored in remote data storage systems as well as data available from a local cache. Additionally, the meta database 112 may include information regarding how data is organized in the remote data storage systems and the local caches. The meta database 112 may allow systems and services to determine whether a piece of data needs to be processed without loading or accessing the actual data from a storage device.

The resource manager 102 may be further coupled to the execution platform 110, which provides (e.g., via the platform agent 109) multiple computing resources that execute various data storage and data retrieval tasks, as discussed in greater detail below. The execution platform 110 may be coupled to multiple data storage devices 120-1, 120-2, . . . , and 120-N that are part of a the cloud storage platform 104. Although three data storage devices 120-1, 120-2, . . . , and 120-N are shown in FIG. 1, the execution platform 110 is capable of communicating with any number of data storage devices. In some embodiments, data storage devices 120-1, 120-2, . . . , and 120-N are cloud-based storage devices located in one or more geographic locations. For example, data storage devices 120-1, 120-2, . . . , and 120-N may be part of a public cloud infrastructure or a private cloud infrastructure. Data storage devices 120-1, 120-2, . . . , and 120-N may be hard disk drives (HDDs), solid state drives (SSDs), storage clusters or any other data storage technology. Additionally, the cloud storage platform 104 may include distributed file systems (such as Hadoop Distributed File Systems (HDFS)), object storage systems, and the like.

In particular embodiments, the communication links between resource manager 102 and client devices 114, the meta database 112, and the execution platform 110 are implemented via one or more data communication networks. Similarly, the communication links between the execution platform 110 and data storage devices 120-1, 120-2, . . . , and 120-N in the cloud storage platform 104 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

In some embodiments, the data storage devices 120-1, 120-2, . . . , and 120-N may be decoupled from the computing resources associated with the execution platform 110. Such architecture supports dynamic changes to cloud data platform 101 based on the changing data storage/retrieval needs as well as the changing needs of the users and systems accessing cloud data platform 101. The support of dynamic changes allows cloud data platform 101 to scale quickly in response to changing demands on the systems and components within cloud data platform 101. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The proxy service 115 is coupled with the execution platform 110 and operatively coupled with the client device 114. The proxy service 115 may perform load balancing, security filtering, source network address translation (SNAT), caching, or other operations. The proxy service 115 may communicate with the execution platform, ensuring that the data sent to and from the client is routed correctly and efficiently. For example, the proxy service 115 may provide SNAT to the client device 114. The proxy service 115 may be a type of proxy server that performs SNAT by changing the source IP address of a packet to the IP address of the proxy server, or, according to aspects of the present disclosure, allowing the client device 114 to perform SNAT and routing proper return traffic to the client device 114. For example, the client device 114 may send a packet (e.g., via the cloud data platform 101) to the proxy service 115. The proxy service 115 may change the source IP address of the packet to another IP address (e.g., a public IP address). The proxy service 115 may then send the packet to the internet (e.g., a remote server) using the changed IP address. The remote server may send a reply packet to the proxy service 115, which then changes the destination IP address to the IP address of the client device 114. The proxy service 115 sends the reply packet to the client device 114. Other performance and functionalities of the proxy service 115 are further discussed herein below.

The resource manager 102, the meta database(s) 112, the execution platform 110, the client devices 114, the proxy service 115, and the cloud storage platform 104 are shown in FIG. 1 as individual components. However, each of resource manager 102, the meta database 112, the execution platform 110, and the cloud storage platform 104 may be implemented as a distributed system (e.g., distributed across multiple systems/platforms at multiple geographic locations). Additionally, each of resource manager 102, the meta database 112, the execution platform 110, and the cloud storage platform 104 can be scaled up or down (independently of one another) depending on changes to the requests received from client devices 114 and the changing needs of cloud data platform 101. Thus, cloud data platform 101 is dynamic and supports regular changes to meet the current data processing needs.

Figure 2:
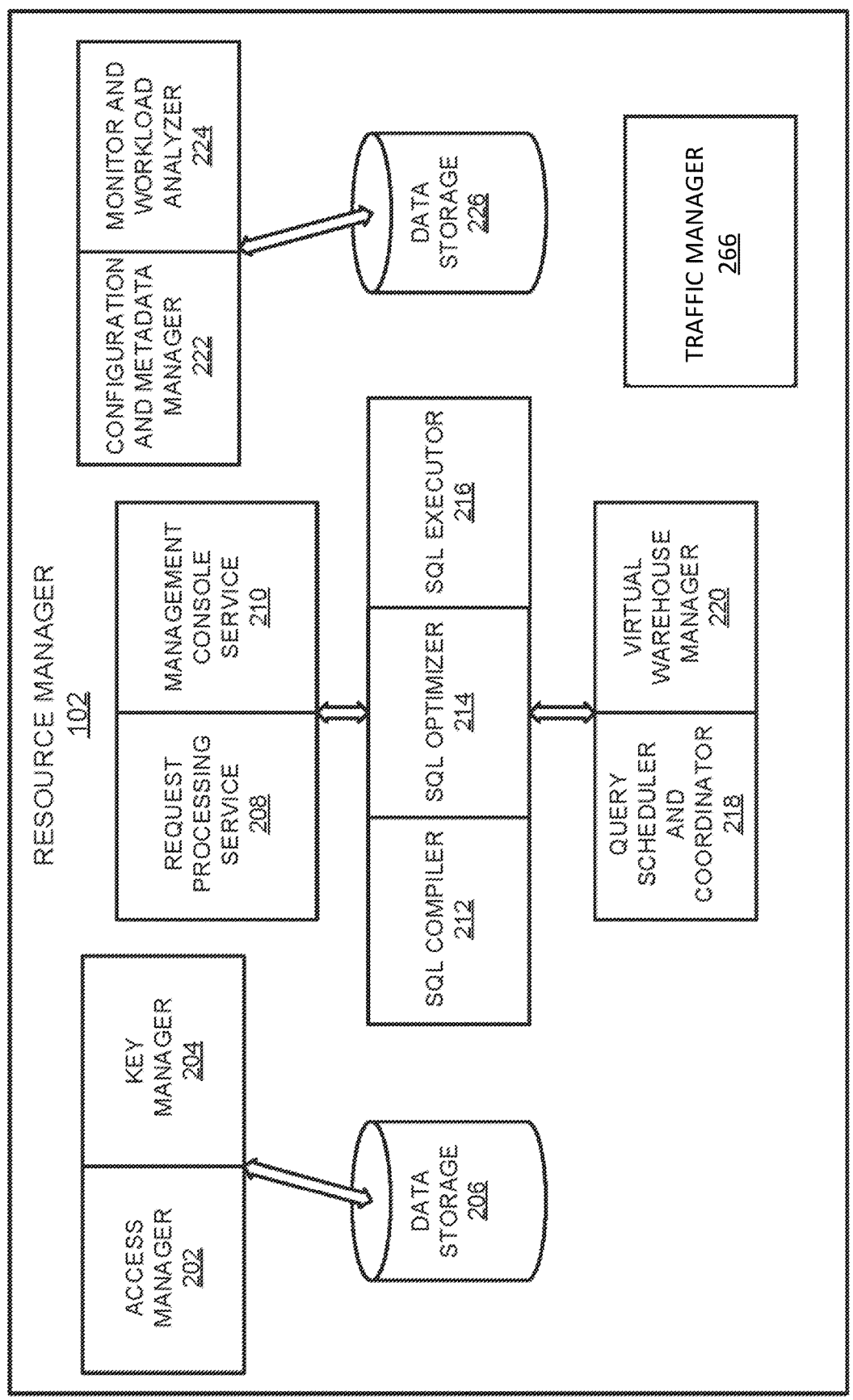
FIG. 2 illustrates a block diagram depicting an embodiment of a resource manager in accordance with the teachings and principles of the disclosure.

FIG. 2 is a block diagram depicting an embodiment of resource manager 102. As shown, the resource manager 102 includes an access manager 202 and a key manager 204 coupled to a data storage device 206. The access manager 202 may handle authentication and authorization tasks for the systems described herein. Key manager 204 may manage storage and authentication of keys used during authentication and authorization tasks. A request processing service 208 manages received data storage requests and data retrieval requests. A management console service 210 supports access to various systems and processes by administrators and other system managers.

The resource manager 102 may also include an SQL compiler 212, an SQL optimizer 214 and an SQL executor 216. SQL compiler 212 parses SQL queries and generates the execution code for the queries. SQL optimizer 214 determines the best method to execute queries based on the data that needs to be processed. SQL executor 216 executes the query code for queries received by resource manager 102. A query scheduler and coordinator 218 may send received queries to the appropriate services or systems for compilation, optimization, and dispatch to the execution platform 110. A virtual warehouse manager 220 manages the operation of multiple virtual warehouses implemented in an execution platform.

Additionally, resource manager 102 includes a configuration and metadata manager 222, which manages the information related to the data stored in the remote data storage devices and in the local caches. A monitor and workload analyzer 224 oversees the processes performed by resource manager 102 and manages the distribution of tasks (e.g., workload) across the virtual warehouses and execution nodes in the execution platform. Configuration and metadata manager 222 and monitor and workload analyzer 224 are coupled to a data storage device 226.

The resource manager 102 also includes a traffic manager 266 for originating and managing outgoing data packets. The traffic manager 266 of the resource manager 102 performs several operations related to originating data packets and managing network address information (similar to the operations by the client address manager 410 of FIG. 4, as discussed below). For example, the traffic manager 266 may assign an Internet Protocol (IP) address through Dynamic Host Configuration Protocol (DHCP). The traffic manager 266 may check whether the IP address is valid or has been changed, or renew the IP address upon expiration. The traffic manager 266 may originate or create data packets to be transmitted to or over the internet. The originated packets include a destination IP address, a source IP address, and payload (data). The traffic manager 266 may maintain the routing table that contains information about the IP address of the next hop for each available destination. If the traffic manager 266 (or the resource manager 102) is connected to the internet via a router or a proxy device, the traffic manager 266 may help in converting the private IP address to a public one for communication with the interview without having the router or the proxy device to further modify outgoing packets, according to aspects of the present disclosure.

Figure 3:
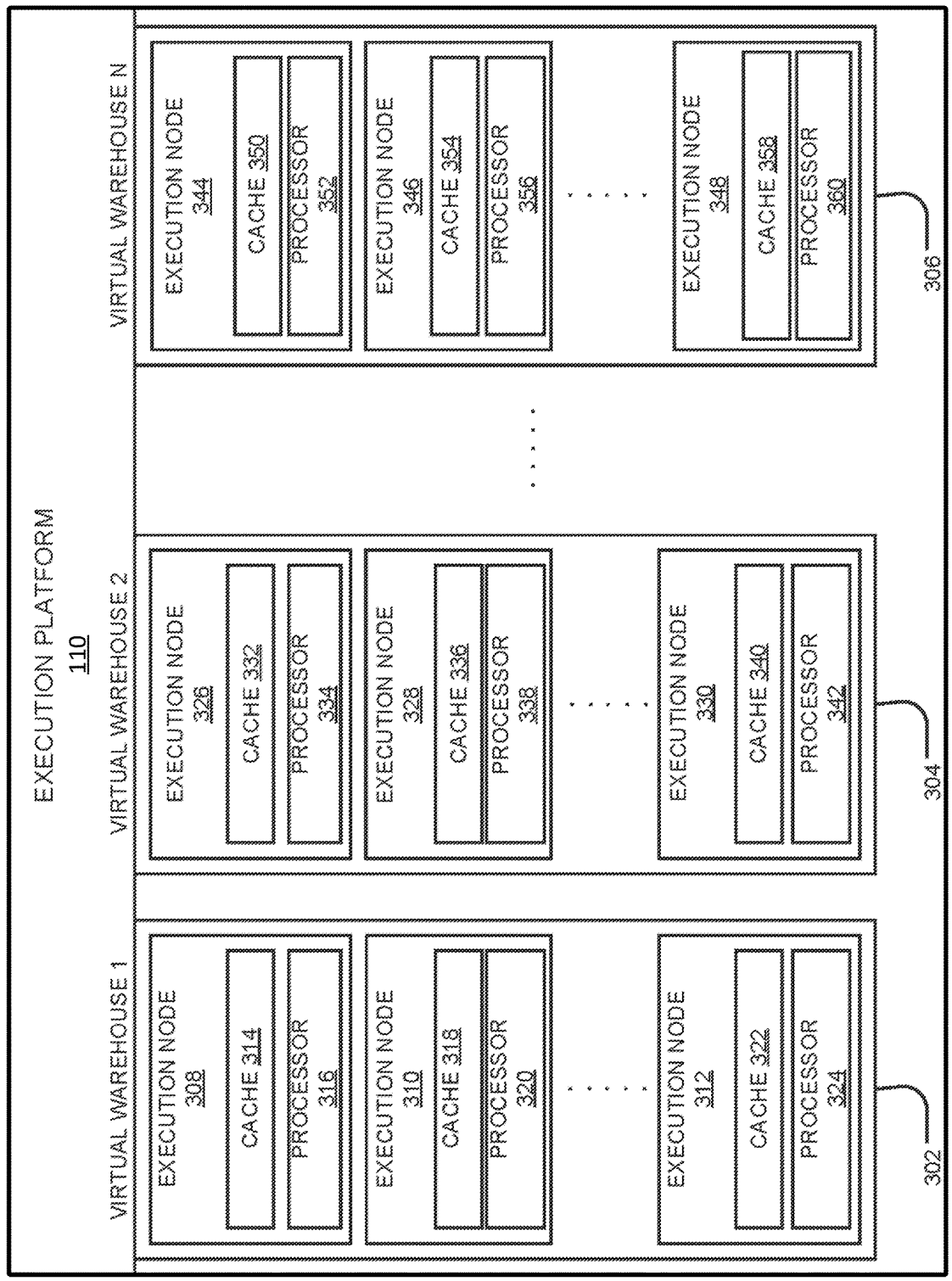
FIG. 3 illustrates a block diagram depicting an embodiment of an execution platform in accordance with the teachings and principles of the disclosure.

FIG. 3 is a block diagram depicting an embodiment of an execution platform, such as the execution platform 110 of FIG. 1. As shown, the execution platform 110 includes multiple virtual warehouses 302, 304, and 306. Each virtual warehouse includes multiple execution nodes that each includes a cache and a processor. Although each virtual warehouse 302, 304, 306 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 302, 304, 306 is capable of accessing any of the data storage devices 120-1, 120-2, . . . , and 120-N shown in FIG. 1. Thus, virtual warehouses 302, 304, 306 are not necessarily assigned to a specific data storage device 120-1, 120-2, . . . , and 120-N and, instead, can access data from any of the data storage devices 120-1, 120-2, . . . , and 120-N. Similarly, each of the execution nodes shown in FIG. 3 can access data from any of the data storage devices 120-1, 120-2, . . . , and 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 302 includes three execution nodes 308, 310, and 312. Execution node 308 includes a cache 314 and a processor 316. Execution node 310 includes a cache 318 and a processor 320. Execution node 312 includes a cache 322 and a processor 324. Each execution node 308, 310, 312 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 302 discussed above, virtual warehouse 304 includes three execution nodes 326, 328, and 330. Execution node 326 includes a cache 332 and a processor 334. Execution node 328 includes a cache 336 and a processor 338. Execution node 330 includes a cache 340 and a processor 342. Additionally, virtual warehouse 306 includes three execution nodes 344, 346, and 348. Execution node 344 includes a cache 350 and a processor 352. Execution node 346 includes a cache 354 and a processor 356. Execution node 348 includes a cache 358 and a processor 360.

Although the execution nodes shown in FIG. 3 each include one cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in a the cloud storage platform 104 (see FIG. 1). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 302, 304, 306 are associated with the same the execution platform 110 of FIG. 1, the virtual warehouses may be implemented using multiple computing systems at multiple geographic locations. For example, virtual warehouse 302 can be implemented by a computing system at a first geographic location, while virtual warehouses 304 and 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, a particular instance of virtual warehouse 302 implements execution nodes 308 and 310 on one computing platform at a particular geographic location and implements execution node 312 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. The execution platform 110 is also fault tolerant. For example, if one virtual warehouse fails, that virtual warehouse is quickly replaced with a different virtual warehouse at a different geographic location.

A particular the execution platform 110 may include any number of virtual warehouses 302, 304, 306. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 4:
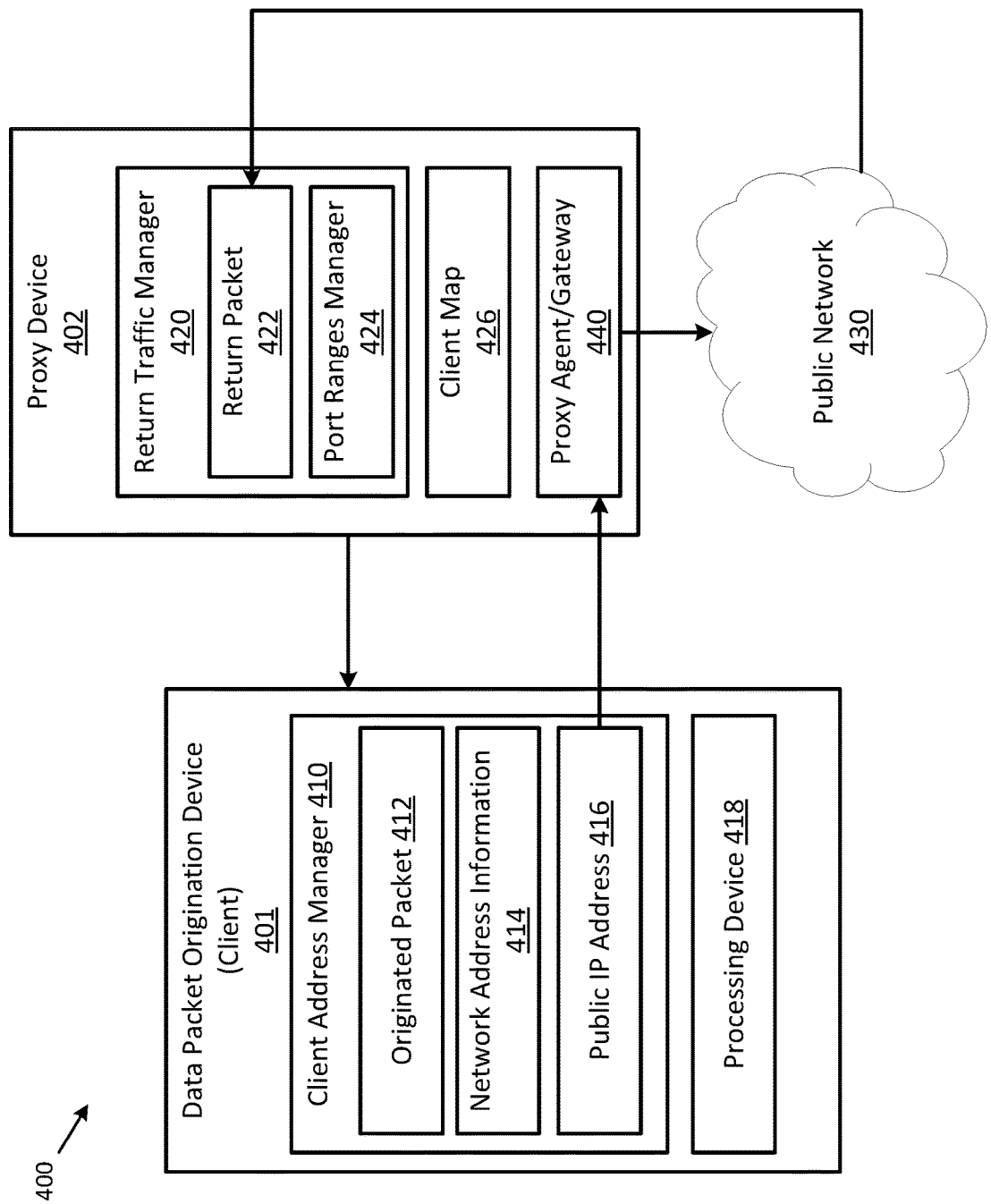
FIG. 4 illustrates a block diagram of components of an example data packet origination device and a proxy device in accordance with the teachings and principles of the disclosure.

FIG. 4 illustrates a block diagram 400 of components of an example data packet origination device 401 and a proxy device 402 in accordance with the teachings and principles of the disclosure. The data packet origination device 401 may be one of the client devices 114 of FIG. 1, while the proxy device 402 may be the proxy service 115 of FIG. 1. As shown in FIG. 4, the data packet origination device 401 includes a client address manager 410 and a processing device 418. The proxy device 402 includes a return traffic manager 420, a client map 426, and a proxy agent/gateway 440. The data packet origination device 401 communicates with the public network 430 via the proxy device 402.

According to aspects of the present disclosure, the data packet origination device 401 performs SNAT on the IP address of the proxy device 402 instead of having the proxy device 402 perform SNAT on the public interface IP address in the outgoing packet to be sent to the public network 430. When the public network 430 returns a packet, the destination IP address of the return packet (e.g., from a NAT gateway) may belong to the proxy device 402. In order for the proxy device 402 to know which data packet origination device 401 (there may be multiple client devices 401, not shown) to forward the return packet, the SNAT port range (e.g., 16-bit) is transformed into partitions, which have been assigned to the corresponding data packet origination devices 401.

The proxy device 402 may then forward the return packet based on the destination port's partition membership (for a corresponding data packet origination device 401). When there are many data packet origination devices 401 to support, and when the 16-bit port range being limited, some ports may be left out for use by local services. As such, the methods of the present disclosure provide flexibility and improved efficiency by using the range correspondence. To expand the SNAT port range and avoid the conflict with local services, secondary IP addresses on the proxy device's public interface may be used in the SNAT operations.

Conventionally, when an asymmetric traffic path is used, the return traffic from the public network 430 may bypass the egress proxies (e.g., the proxy device 402) and arrive at the originating data packet origination device 401 unencapsulated. This may be a security weakness, because the data packet origination devices 401 and the user-defined functions (UDFs) are short-lived. The data packet origination device 401 (client device) and the UDFs may be created and disposed of at a rapid rate.

For example, by the time the return traffic is to be received by the data packet origination device 401, the original packet-originating device 401 might have been gone or replaced (e.g., by a different packet originating device, such as a sandbox). In some cases, one data packet origination device 401 is gone and another data packet origination device 401 has been created to take the same IP address. As such, the current data packet origination device 401 may receive unwanted traffic that likely belongs to other customers. Therefore, the use of the same IP address opens the possibility of a spoof-attack. The use of unencapsulated external traffic may further exacerbates this concern. The present disclosure overcomes this weakness by using port ranges to identify a correct corresponding data packet origination device 401.

As shown in FIG. 4, the client address manager 410 of the data packet origination device 401 performs several operations related to originating a data packet 412 and managing network address information 414. For example, the client address manager 410 may assign an Internet Protocol (IP) address through Dynamic Host Configuration Protocol (DHCP), where the data packet origination device 401 may obtain automatically an IP address from a DHCP server in the network. The client address manager 410 may frequently check whether the IP address is valid or has been changed, or renew the IP address upon expiration. The client address manager 410 originates or creates data packets 412 to be transmitted to or over the public network 430. The originated packets 412 contain the destination IP address, source IP address, and payload (data).

In some cases, the client address manager 410 maintains the routing table that contains information about the IP address of the next hop for each available destination. If the client address manager 410 (or the data packet origination device 401) is behind a router (e.g., the proxy device 402)

that uses NAT, the client address manager 410 may help in converting the private IP address to a public one, or vice versa, for communication with external networks (such as the public network 430).

For example, the client address manager 410 maintains a NAT translation table that provides a public IP address 416 for each connection. The public IP address 416 may include a port number or a port range indicator associated with the data packet origination device 401. Unlike conventional processes where the NAT is performed at the proxy device 402, the client address manager 410 of the data packet origination device 401 may directly output a public IP address. The proxy agent or gateway 440 of the proxy device 402 may forward the public IP address to the public network 430.

When a server of the public network 430 responses, a return packet 422 may be sent to the return traffic manager 420 of the proxy device 402. As shown, the return traffic manager 420 includes a port ranges manager 424, which identifies a corresponding data packet origination device 401 based on the port ranges. The proxy device 402 may then send the return packet 422 to the corresponding data packet origination device 401. The proxy device 402 may further include a client map 426 providing the relationship between multiple data packet origination devices 401 and the corresponding port ranges.

In some cases, the client address manager 410 may resolve logical addresses (e.g., uniform resource locators (URLs)) to physical addresses (e.g., media access control (MAC) addresses) using protocols such as address resolution protocol (ARP). In some cases, the client address manager 410 may conduct network troubleshooting tasks, such as, for example, testing the connection, diagnosing connectivity issues, or verifying the configuration of the public network 430 and/or the proxy device 402.

During operation, the client address manager 410 may direct outgoing data packets 412 to the appropriate destination based on destination addresses and routing table(s) of the client address manager 410 and/or the proxy device 402. In some cases, the client address manager 410 may interact with DNS servers to translate domain names into corresponding IP addresses. The client address manager 410 might perform other tasks, such as setting a subnet mask (e.g., identifying the network and host portions of an IP address) for the data packet origination device 401.

In some embodiments, the processing device 418 is configured to implement the operations by the client address manager 410, such as modifying network address information (e.g., a private IP address) in an IP header of a packet using the public IP address 416. The processing device 418 may send the packet 412 to the public network 430 based on the public IP address 416. The processing device 418 may send the packet 412 via the proxy device 402. The proxy agent or gateway 440 of the proxy device 402 maintains the public identifier 416 of the packet 412 without further modification (e.g., the data packet originating device 401 outputs a public IP address).

In some cases, the processing device 418 may further associate with one of multiple port ranges (e.g., managed by the port ranges manager 424). One or more of the multiple port ranges may be unique to the corresponding data packet origination devices 401. The multiple port ranges are partitioned at the proxy device 402, such as by the port ranges manager 424. In some cases, the processing device 418 may receive, via the proxy device 402, the return packet 422 from the public network 430. The processing device 418 may receive the return packet 422 based on the one or more of the multiple port ranges partitioned by the port ranges manager 424. For example, the one or more of the multiple port ranges may include an IP address and a port range tuple corresponding to each data packet origination device 401. In some cases, the proxy device 402 maintains the client map 426, which includes a table of at least one of the network address information, a client identifier associated with the data packet origination device, or the multiple port ranges and corresponding clients.

In some cases, the processing device 418 may further register a policy with the proxy device 402. The one or more of the multiple port ranges may be partitioned by the port ranges manager 424 for the data packet origination device 401 upon the registering of the policy. The processing device 418 may further generate, the client identifier at the data packet origination device 401, for self-identification in the policy registered with the proxy device 402. For example, the identifier may be added as a field in the tunneling interface header to prevent zombie traffic from arriving at the data packet origination device 401 (e.g., a client device, a sandbox, or the like).

In some embodiments, the proxy device 402 can further validate that the source (IP, port) to be in the range of the SNAT partition (e.g., managed by the port ranges manager 424) leased to this data packet origination device 401, in addition to the current policy validation. In some embodiments, the data packet origination device 401 may validate that the identifier matches its own. Since the identifier is created by data packet origination device 401 on a per startup session basis, such process may ensure that the data packet origination device 401 may reject packets from its previous startup session, even if data packet origination device 401 restarts with the same IP address, which may be very likely or certainly. As such, the present disclosure overcomes the issues of the conventional processes mentioned above. The check as discussed may also add a protection layer against spoof attacks by a client device sending packets to a destination that is policy-registered by another client device on a different data packet origination device 401 using the same egress proxy.

The present disclosure provides additional benefits or advantages over the conventional process. For example, because the return traffic arrives from tunneling interface on the data packet origination device 401, and has a destination IP address of the proxy device 402, destination network address translation (DNAT) may not be required on public interface. Therefore, the possibility of port-conflicting with local services on data packet origination device 401 may be eliminated or reduced. Because NAT is performed on secondary IP addresses (of the proxy device 402), the possibility of port-conflicting with the local service of the proxy device may also be eliminated or reduced. The proxy device 402's SNAT space is partitioned into use by data packet origination devices 401. Each data packet origination device 401 may only fill up its own partition. In the case of DOS attack1, the blast radius is limited to this data packet origination device 401 only and may not affect other data packet origination device 401's external access sessions.

In some cases, the data packet origination device 401 may load-balance among multiple (not shown) egress proxies or proxy devices 402. The data packet origination device 401 uses one SNAT partition from each proxy device 402. Now the NAT table entries may no longer have all the same source IPs, but different source IPs. The data packet origination device 401 may know exactly when to expire and remove an entry, when the data packet origination device 401 has done with that proxy device 402. As such, a better SNAT table cleanup scheme may be implemented, rather than relying on a least recently used (LRU) cache that may involve many errors. In addition, the methods disclosed herein also accommodates the failover scheme (e.g., promoting a secondary to a primary).

For example, the client map 426 may now be sent in the regular heartbeat message to a standby proxy (e.g., another proxy device 402). Specifically, at every preset interval, a heartbeat message is transmitted to the standby proxy device (not shown). The heartbeat message may convey the peer group id, and the client map 426 of the active proxy device 402. Every time the client map 426 has been updated, an additional heartbeat message may be sent to the data packet origination device 401. The standby proxy may thus save the client map 426 received from the last/most recent heartbeat message. Upon detection of any missing heartbeat messages, the standby proxy may perform the following operations to assume the duty of the active proxy device 402. The standby proxy may add the active proxy's secondary IP addresses to its public interface, in addition to those of its own. For each secondary IP address added, the standby proxy may send a gratuitous address resolution protocol (ARP) to the local subnet. The ARP may merge the client map 426 with information of its own.

Figure 5:
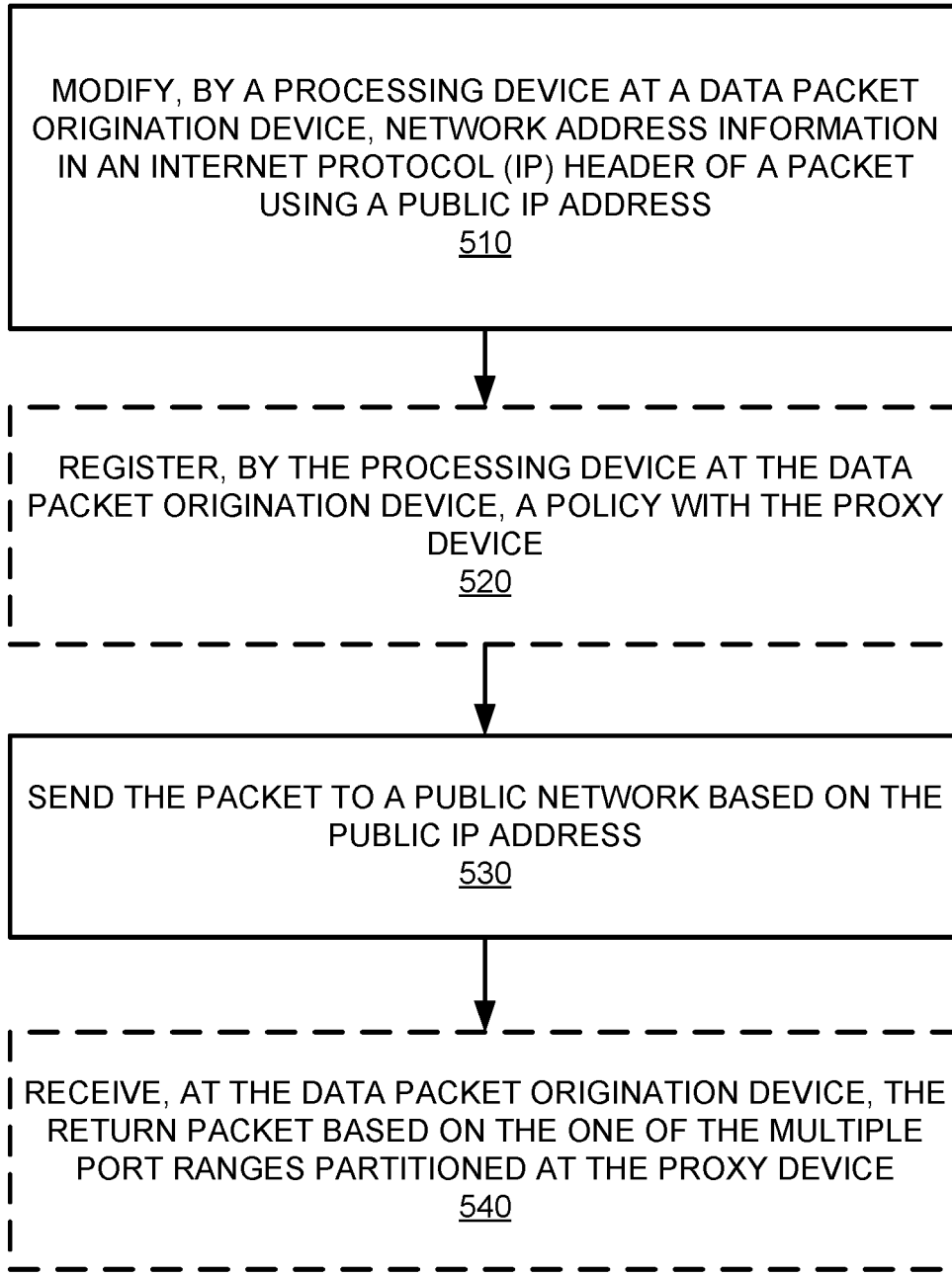
FIG. 5 illustrates a schematic diagram of a process flow of port-range lease based network address translation, in accordance with the teachings and principles of the disclosure.

FIG. 5 illustrates a schematic diagram of a process flow 500 of port-range lease based network address translation, in accordance with the teachings and principles of the disclosure. The process flow 500 may be implemented by a processing device of a client device, such as the processing device 418 of the data packet origination device 401 of FIG. 4, or a processing device 1902 of FIG. 8. As shown, the process flow 500 starts at 510 by modifying, by a processing device at a data packet origination device, network address information in an internet protocol (IP) header of a packet using a public IP address.

The processing device at the data packet origination device, at 520, may register a policy with the proxy device. For example, the policy may include an egress policy in control of egress IP, based on identify, IP address, and/or geolocation.

The processing device sends, at 530, the packet to a public network based on the public IP address. For example, the data packet origination device uses the public IP address to provide a public IP address that need no further modification by a proxy device. The packet may be sent via the proxy device, which maintains the public identifier of the packet without further modification.

The data packet origination device may receive, at 540, the return packet based on one of multiple port ranges partitioned at the proxy device. For example, the proxy device may partition multiple port ranges. One of the multiple port ranges is unique to the data packet origination device. In some cases, the one or more of the multiple port ranges comprises an IP address and a port range tuple. In some cases, the proxy device maintains a client map, a table of at least one of: the network address information, a client identifier associated with the data packet origination device, or the multiple port ranges and corresponding clients. In some cases, the one or more of the multiple port ranges is partitioned for the data packet origination device upon the registering of the policy.

In some cases, the processing device at the data packet origination device generates the client identifier for self-identification in the policy registered with the proxy device.

In some cases, modifying the network address information in the IP header of the packet using the public IP address includes translating, based on the one or more of the multiple port ranges, a private network address into a public network address. The network address information includes a source IP (e.g., of a secondary IP address) of the proxy device.

In some cases, the client map is keyed using at least a highest number of bits of port and respective IP addresses.

Figure 6:
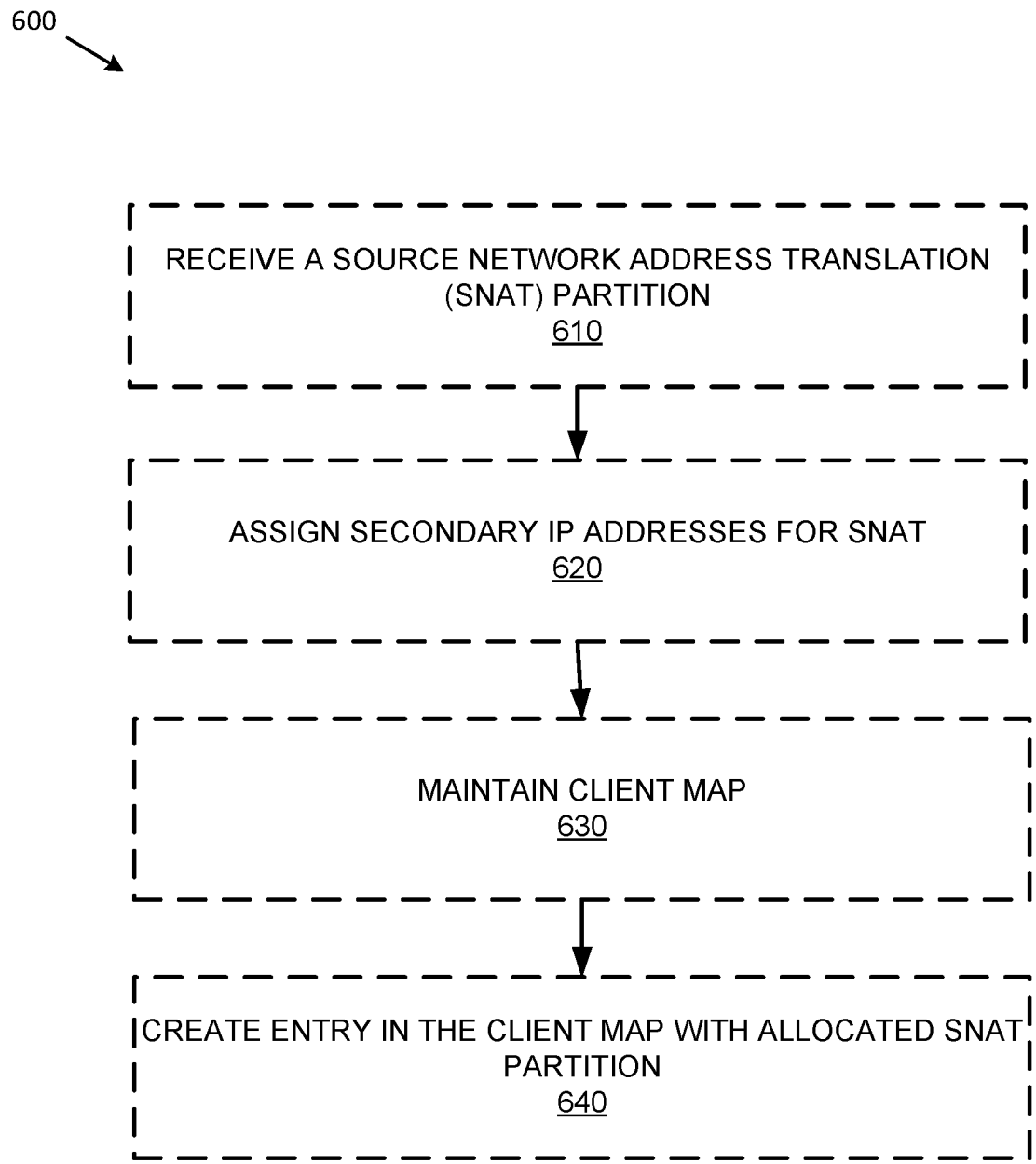
FIG. 6 illustrates a schematic diagram of a process flow of control plane operation for the network address translation of FIG. 5, in accordance with the teachings and principles of the disclosure.

FIG. 6 illustrates a schematic diagram of a process flow 600 of control plane operation for the network address translation of FIG. 5, in accordance with the teachings and principles of the disclosure. The process flow 600 starts at 610 where each client device may receive a SNAT partition. A SNAT partition includes an (proxy device secondary) IP address and port range tuple when the client device first registers a policy with the proxy device.

At 620, the public interface of each proxy device may have a few (secondary) IP addresses assigned for SNAT (only). The SNAT port range may be partitioned into several sub ranges using the highest bits of the 16-bit port number. Assuming that the number of secondary IP addresses on public interface is 4, and the port range is divided using the highest 4 bits into 16 subranges, this means that a proxy device may support 4 by 16, or 64, client devices at any given time. Each having a SNAT partition of the remaining 12 bits, or 4096 ports to use.

At 630, the proxy device maintains a client map, which is a table of client IP address, client identifier, SNAT partition. The table may be in eBPF code, one entry for each client device it currently supports.

At 640, an entry in the client map is created with an allocated SNAT partition when the first time a client device registers a policy. Subsequent policy registration from an existing client may only find the existing entry, and not allocate any new SNAT partition. A client map entry is deleted, and its SNAT partition freed, at the time of its last policy un-registration. When a client device starts, the client device may create a identifier to identify itself. The client device uses the identifier in its policy registration messages, which may be kept in the proxy device's corresponding client map entry.

Figure 7:
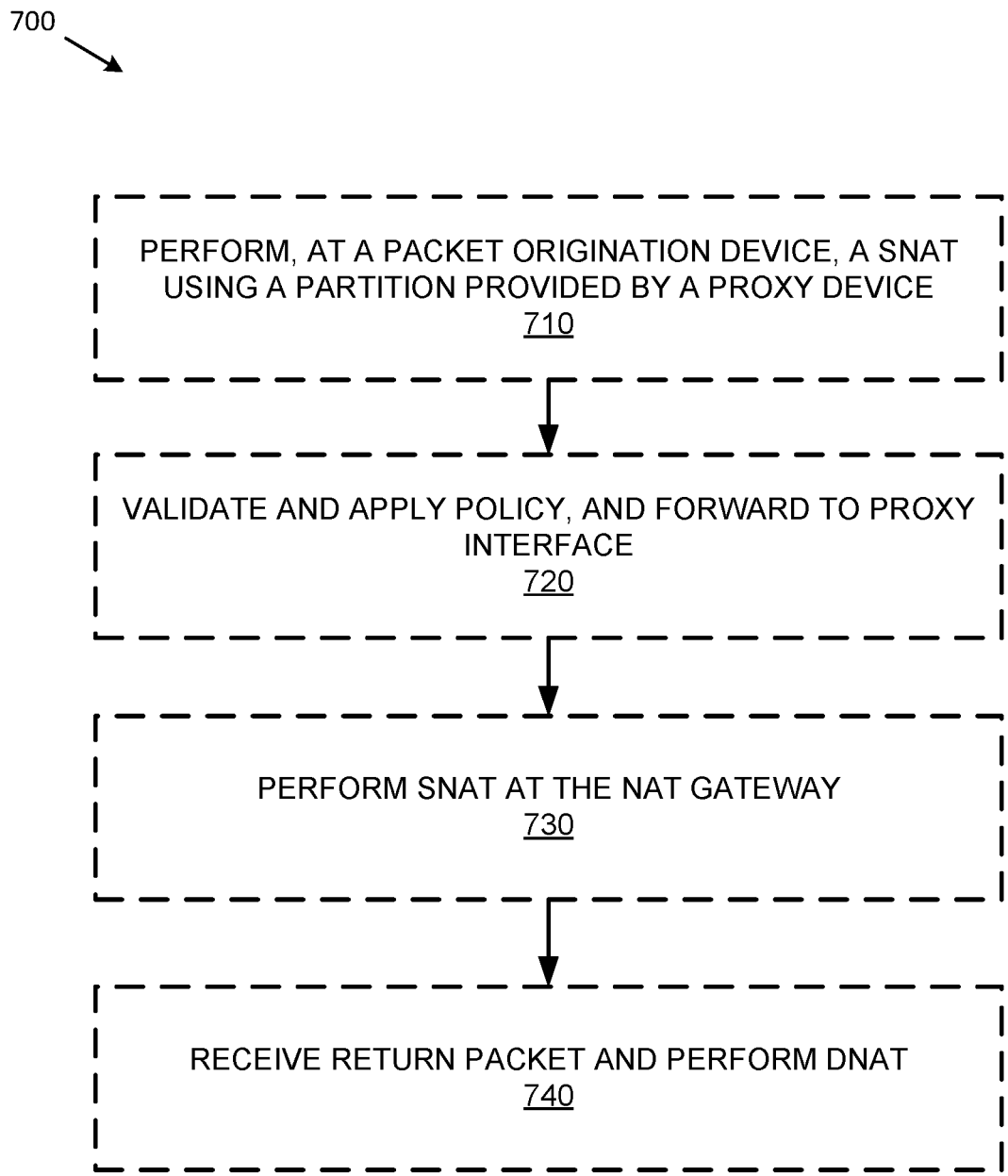
FIG. 7 illustrates a schematic diagram of a process flow of data plane operation for the network address translation of FIG. 5 in accordance with the teachings and principles of the disclosure.

FIG. 7 illustrates a schematic diagram of a process flow 700 of data plane operation for the network address translation of FIG. 5 in accordance with the teachings and principles of the disclosure. The process flow 700 starts, at 710, by performing a SNAT operation using the SNAT partition the client device received from the proxy device to translate the source IP address from client device directly to the proxy device's IP address (public). The packet may have the destination IP of the service on the Internet, and a source IP of one of the egress proxy's secondary IP addresses.

At 720, the client device validates and applies the policy. As the packet arrives at the proxy device's tunneling interface, a policy validation may be applied. The packet may be forwarded to the proxy's public interface.

At 730, the client device performs SNAT at the NAT gateway. When the packet reaches the NAT gateway, the packet's source address may be SNAT'd a second time to the public IP address of the NAT gateway.

At 740, the client device receives return packet and performs DNAT. For example, the return packet from the Internet service reaches NAT gateway, and its destination IP address may be DNAT'd to that of the proxy device's (secondary) IP address. The packet reaches the proxy device, which looks up its client map using (dest IP, dest port) to find its corresponding client (client device) IP address. The proxy device forwards the packet to its tunneling interface using this IP address as the destination IP of its outer (tunneling interface) header.

In some cases, the client map may be keyed using (IP Addr, highest four bits of port). The packet's (destIP, destPort & 0xf000) may be used as the lookup key to find the corresponding entry in the client map, a very simple and fast operation. When the packet arrives at client device's tunneling interface, the client device performs a DNAT to translate the (dest IP, dest Port) into those of the sandbox.

Figure 8:
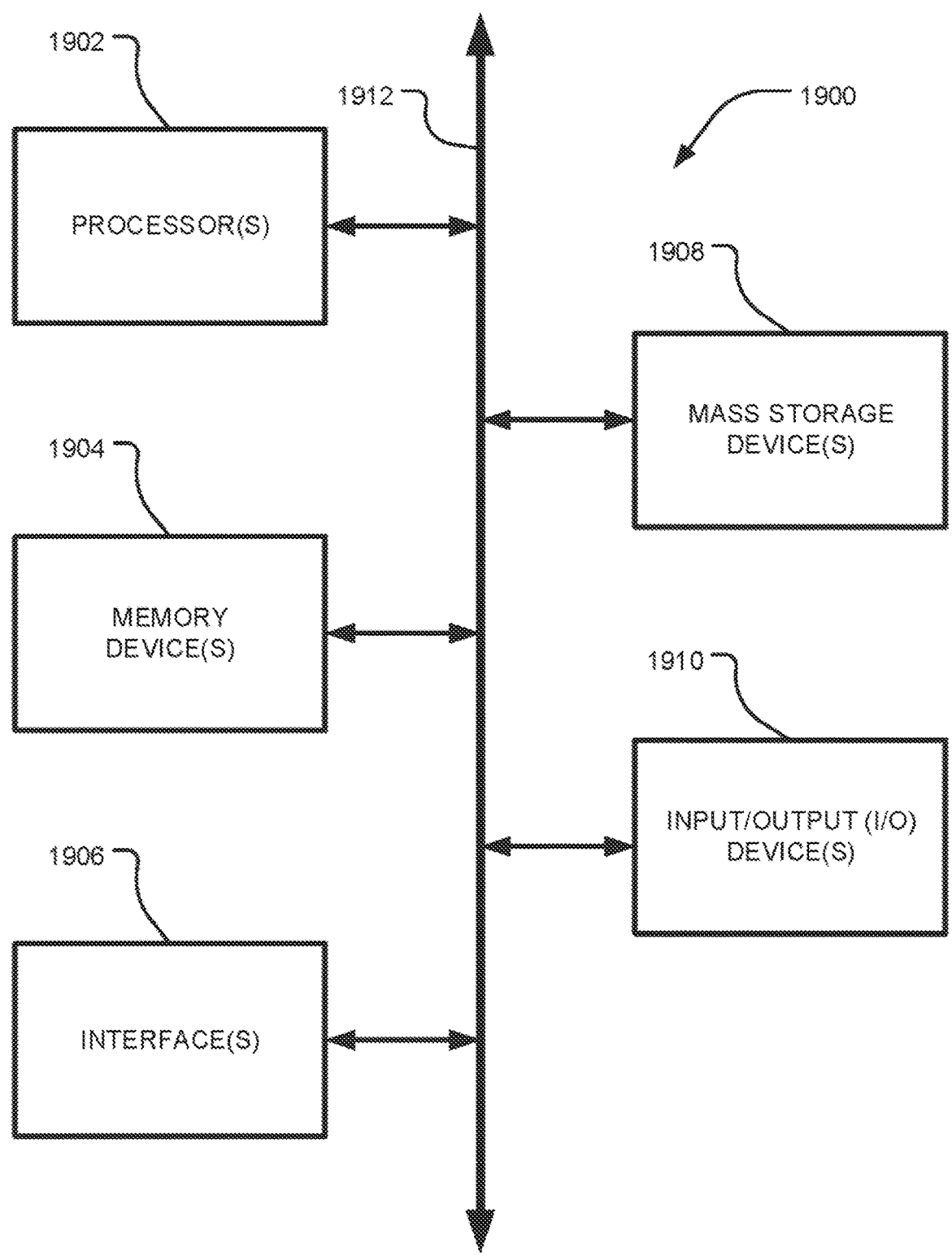
FIG. 8 illustrates an example computing device in accordance with the teachings and principles of the disclosure.

FIG. 8 is a block diagram depicting an example computing device 1900. In some embodiments, computing device 1900 is used to implement one or more of the systems and components discussed herein. For example, computing device 1900 may allow a user or administrator to access the resource manager 102. Further, computing device 1900 may interact with any of the systems and components described herein. Accordingly, computing device 1900 may be used to perform various procedures and tasks, such as those discussed herein. Computing device 1900 can function as a server, a client or any other computing entity. Computing device 1900 can be any of a wide variety of computing devices, such as a desktop computer, a notebook computer, a server computer, a handheld computer, a tablet, and the like.

Computing device 1900 includes one or more processor(s) 1902, one or more memory device(s) 1904, one or more interface(s) 1906, one or more mass storage device(s) 1908, and one or more Input/Output (I/O) device(s) 1910, all of which are coupled to a bus 1912. Processor(s) 1902 include a processing device or controllers that execute instructions stored in memory device(s) 1904 and/or mass storage device(s) 1908. Processor(s) 1902 may also include various types of computer-readable media, such as cache memory.

Memory device(s) 1904 include various computer-readable media or non-transitory memories, such as volatile memory (e.g., random access memory (RAM)) and/or non-volatile memory (e.g., read-only memory (ROM)). Memory device(s) 1904 may also include rewritable ROM, such as Flash memory.

Mass storage device(s) 1908 include various computer readable media, such as magnetic tapes, magnetic disks, optical disks, solid state memory (e.g., Flash memory), and so forth. Various drives may also be included in mass storage device(s) 1908 to enable reading from and/or writing to the various computer readable media. Mass storage device(s) 1908 include removable media and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Interface(s) 1906 include various interfaces that allow computing device 1900 to interact with other systems, devices, or computing environments. Example interface(s) 1906 include any number of different network interfaces, such as interfaces to local area networks (LANs), wide area networks (WANs), wireless networks, and the Internet.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900 and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended to convey the implementation apparatus for accomplishing a process, such as by hardware, or a combination of hardware, software, and/or firmware, for the purposes of performing all or parts of query operations.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments may be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method of network address translation, the method comprising:

modifying, by a processing device, at a data packet origination device that a packet originates from, network address information in an internet protocol (IP) header of the packet using a public IP address;

sending the packet to a public network based on the public IP address, wherein sending the packet to the public network based on the public IP address comprises sending the packet via a proxy device, wherein the proxy device maintains a public identifier of the packet without further modification; and partitioning multiple port ranges at the proxy device, wherein one or more of the multiple port ranges are unique to the data packet origination device.

2. The method of claim 1, further comprising:

receiving, at the data packet origination device, a return packet based on the one or more of the multiple port ranges partitioned at the proxy device.

3. The method of claim 2, wherein the one or more of the multiple port ranges comprise an IP address and a port range tuple.

4. The method of claim 3, wherein the proxy device maintains a client map that includes a table of at least one of:
the network address information;
a client identifier associated with the data packet origination device; or
the multiple port ranges and corresponding clients.

5. The method of claim 4, further comprising:
registering, by the processing device at the data packet origination device, a policy with the proxy device, wherein the one or more of the multiple port ranges are partitioned for the data packet origination device upon the registering of the policy.

6. The method of claim 5, further comprising:
generating the client identifier, at the data packet origination device, for self-identification in the policy registered with the proxy device.

7. The method of claim 4, wherein the client map is keyed using at least a highest number of bits of port and respective IP addresses.

8. The method of claim 1, wherein modifying the network address information in the IP header of the packet using the public IP address comprises:
translating, based on the one or more of the multiple port ranges, a private network address into a public network address, wherein the network address information comprises a source IP of the proxy device.

9. A system comprising:
a memory; and
a processing device operatively coupled to the memory, the processing device and the memory are to:
modify, at a data packet origination device that a packet originates from, network address information in an internet protocol (IP) header of the packet using a public IP address;
send the packet to a public network based on the public IP address via a proxy device, wherein the proxy device maintains a public identifier of the packet without further modification; and
associate with one of multiple port ranges that is unique to the data packet origination device, wherein the multiple port ranges are partitioned at the proxy device.

10. The system of claim 9, wherein the processing device is further to:
receive, at the data packet origination device and via the proxy device, a return packet from the public network based on the one or more of the multiple port ranges.

11. The system of claim 10, wherein the one or more of the multiple port ranges comprise an IP address and a port range tuple.

12. The system of claim 11, wherein the proxy device maintains a client map, a table of at least one of:
the network address information;
a client identifier associated with the data packet origination device; or
the multiple port ranges and corresponding clients.

13. The system of claim 12, wherein the processing device is further to:
register a policy with the proxy device, wherein the one or more of the multiple port ranges are partitioned for the data packet origination device upon the registering of the policy.

14. The system of claim 13, wherein the processing device is further to:
generate, the client identifier at the data packet origination device, for self-identification in the policy registered with the proxy device.

15. The system of claim 12, wherein the client map is keyed using at least a highest number of bits of port and respective IP addresses.

16. The system of claim 9, wherein to modify the network address information in the IP header of the packet using the public IP address is to:
translate, based on the one or more of the multiple port ranges, a private network address into a public network address, wherein the network address information comprises a source IP of the proxy device.

17. A non-transitory computer-readable medium having instructions stored thereon which, when executed by a processing device, cause the processing device to:
modify, at a data packet origination device, network address information in an internet protocol (IP) header of a packet using a public IP address;
send the packet to a public network based on the public IP address via a proxy device, wherein the proxy device maintains a public identifier of the packet without further modification; and
associate with one of multiple port ranges that is unique to the data packet origination device, wherein the multiple port ranges are partitioned at the proxy device.

18. The non-transitory computer-readable medium of claim 17, wherein the processing device is further to:
receive, at the data packet origination device and via the proxy device, a return packet from the public network based on the one or more of the multiple port ranges.

19. The non-transitory computer-readable medium of claim 18, wherein the one or more of the multiple port ranges comprise an IP address and a port range tuple.

20. The non-transitory computer-readable medium of claim 19, wherein the proxy device maintains a client map, a table of at least one of:
the network address information;
a client identifier associated with the data packet origination device; or
the multiple port ranges and corresponding clients.

21. The non-transitory computer-readable medium of claim 20, wherein the processing device is further to:
register a policy with the proxy device, wherein the one or more of the multiple port ranges are partitioned for the data packet origination device upon the registering of the policy.

22. The non-transitory computer-readable medium of claim 21, wherein the processing device is further to:
generate, the client identifier at the data packet origination device, for self-identification in the policy registered with the proxy device.

23. The non-transitory computer-readable medium of claim 20, wherein the client map is keyed using at least a highest number of bits of port and respective IP addresses.

24. The non-transitory computer-readable medium of claim 17, wherein to modify the network address information in the IP header of the packet using the public IP address is to:
translate, based on the one or more of the multiple port ranges, a private network address into a public network address, wherein the network address information comprises a source IP of the proxy device.

\* \* \* \* \*